United States Patent

[11] 3,587,875

| [72] | Inventor | Joseph Thomas Carmody<br>100 Balaclava Road, Shepparton, Victoria, Australia |
|---|---|---|
| [21] | Appl. No. | 768,341 |
| [22] | Filed | Oct. 17, 1968 |
| [45] | Patented | June 28, 1971 |

[54] APPARATUS FOR PALLETIZING CANS, JARS, BOTTLES OR OTHER CONTAINERS
5 Claims, 6 Drawing Figs.

| [52] | U.S. Cl. | 214/6 |
|---|---|---|
| [51] | Int. Cl. | B65g 57/04 |
| [50] | Field of Search | 214/6 (A), 6 (K), 6 (FS), 6 (H), 6 (P), 6 (M), 6 (G) |

[56] References Cited
UNITED STATES PATENTS

| 2,524,846 | 10/1950 | Socke et al. | 214/6(FS)X |
| 2,858,009 | 10/1958 | Bainbridge | 214/6(FS)X |
| 3,389,810 | 6/1968 | Wolfe et al | 214/6(P) |
| 3,392,851 | 7/1968 | Pearne et al. | 214/6(A) |
| 3,432,045 | 3/1969 | Bauer | 214/6(K)X |
| 2,832,480 | 4/1958 | Barski | 214/6(K) |
| 3,262,594 | 7/1966 | Teago | 214/6(A)UXA |

*Primary Examiner*—Robert G. Sheridan
*Assistant Examiner*—Robert J. Spar
*Attorney*—Michael S. Striker ABSTRACT: Apparatus for palletizing cans or similar containers in which the containers are marshalled against a releasable stop and in which an accumulation of such containers are gripped by such means and first moved horizontally while the stop is released and subsequently thereto the stop is again restored to its active position to assure a new accumulation of containers upstream of the stop while the containers which have passed the stop are lowered onto a pallet.

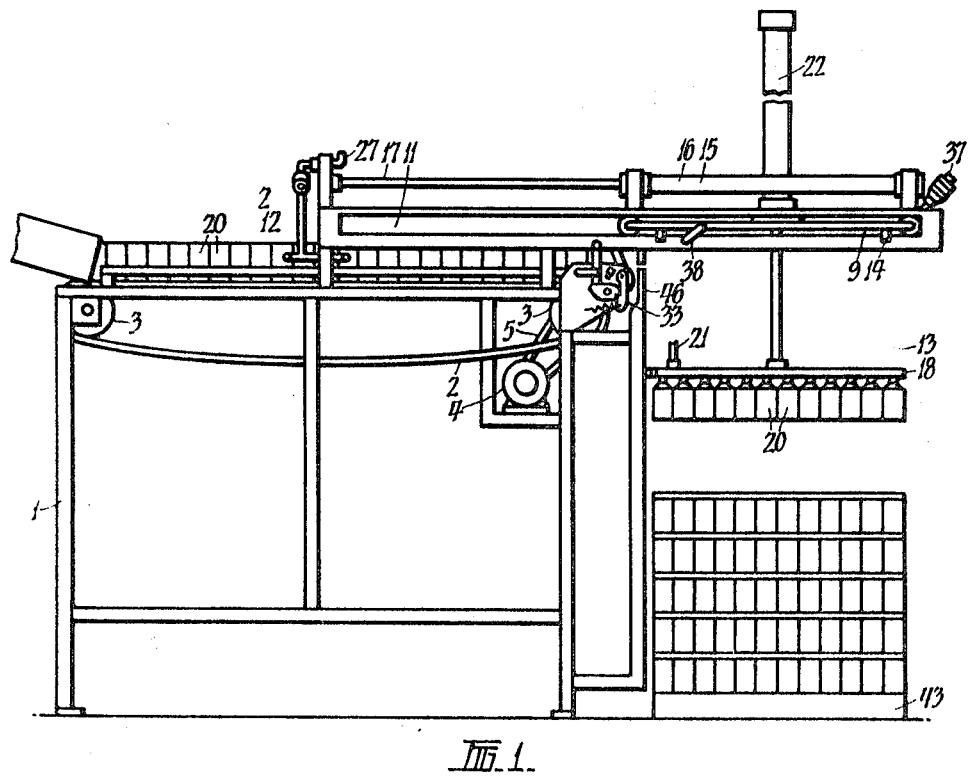
Fig. 1
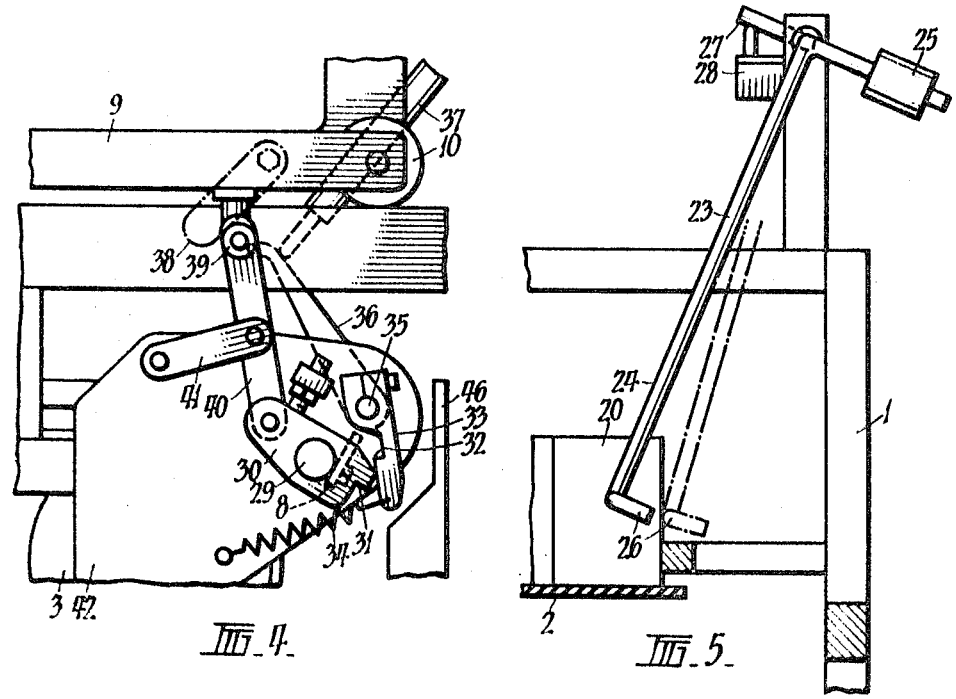
Fig. 4
Fig. 5
INVENTOR
JOSEPH THOMAS CARMODY

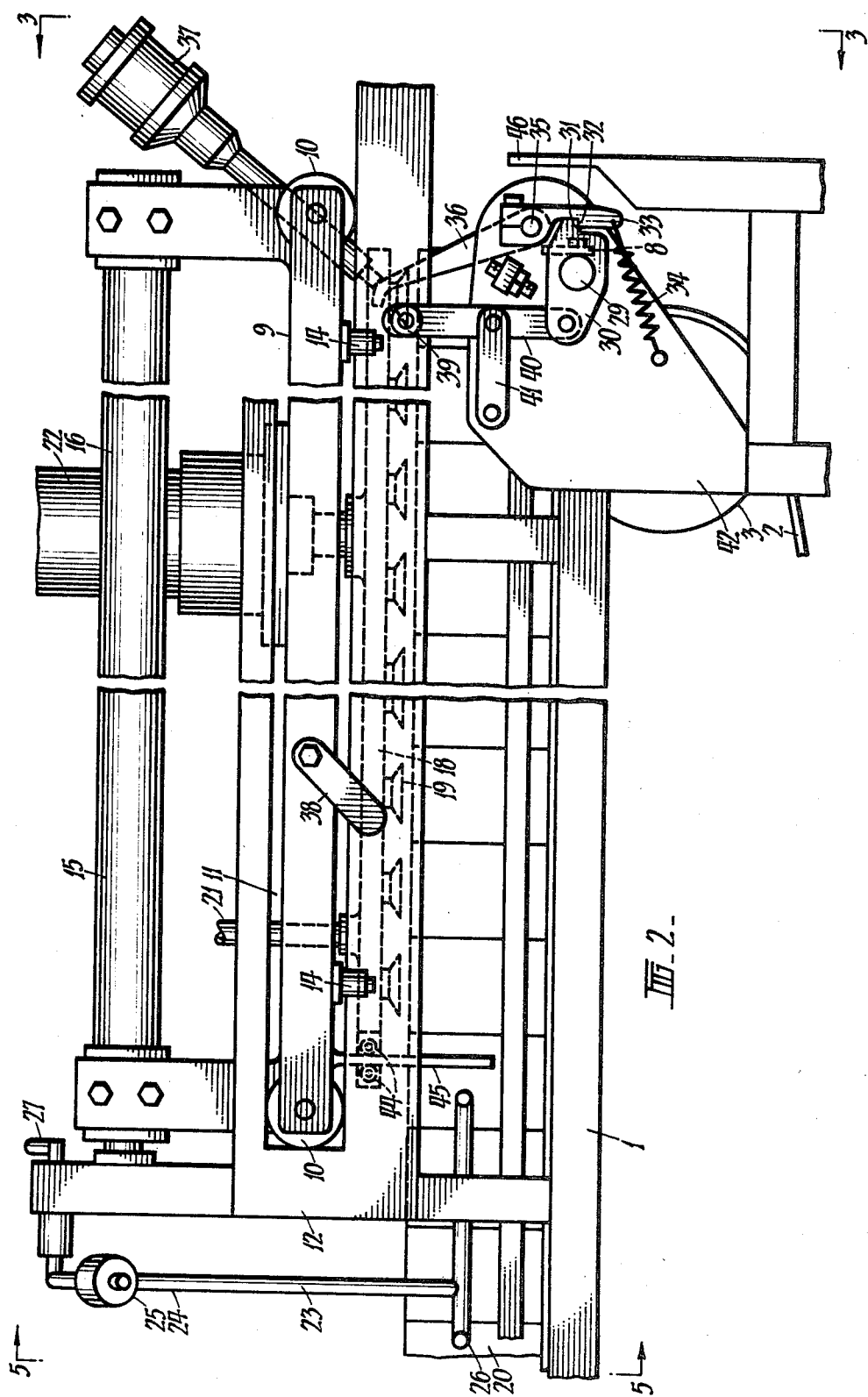

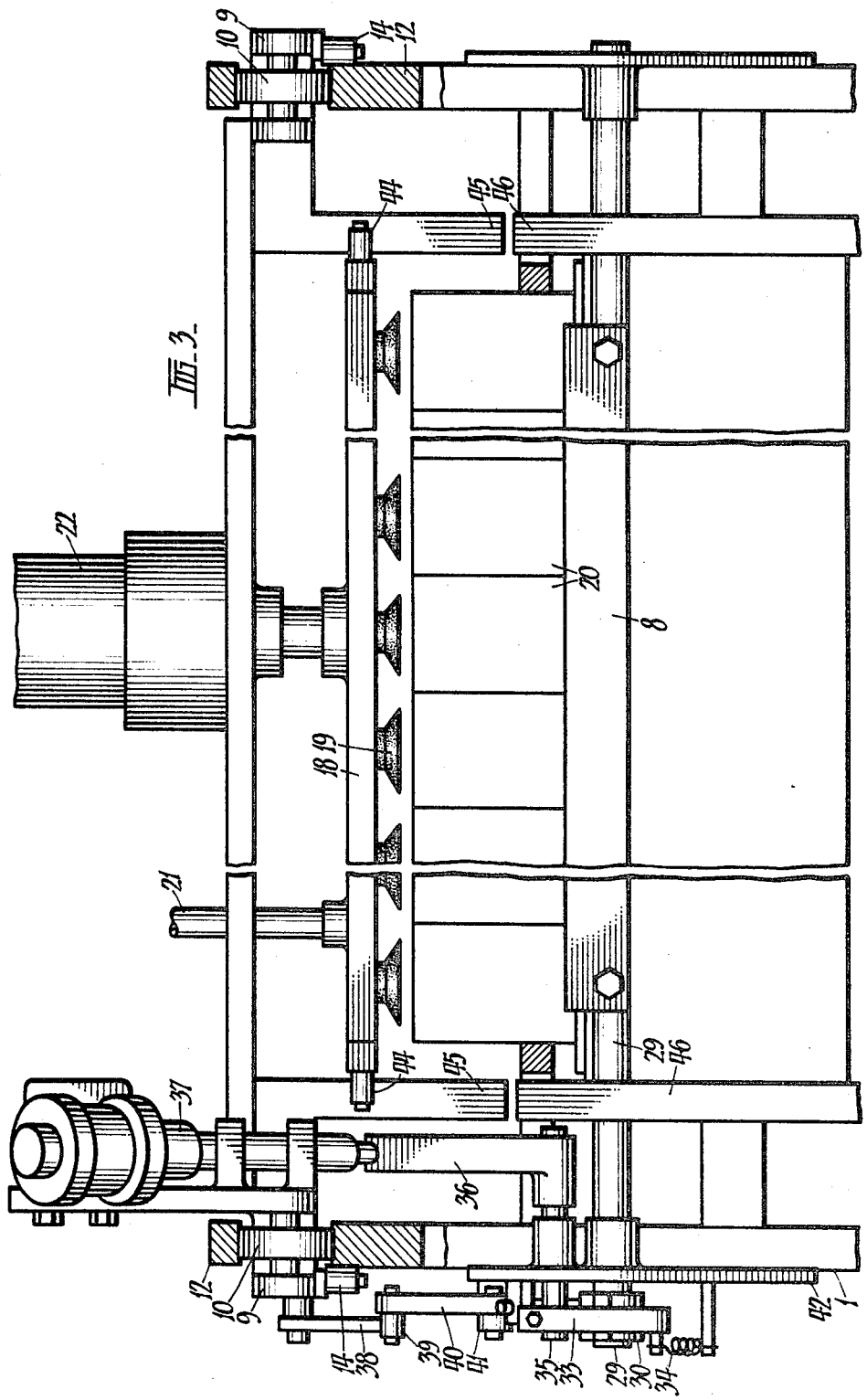

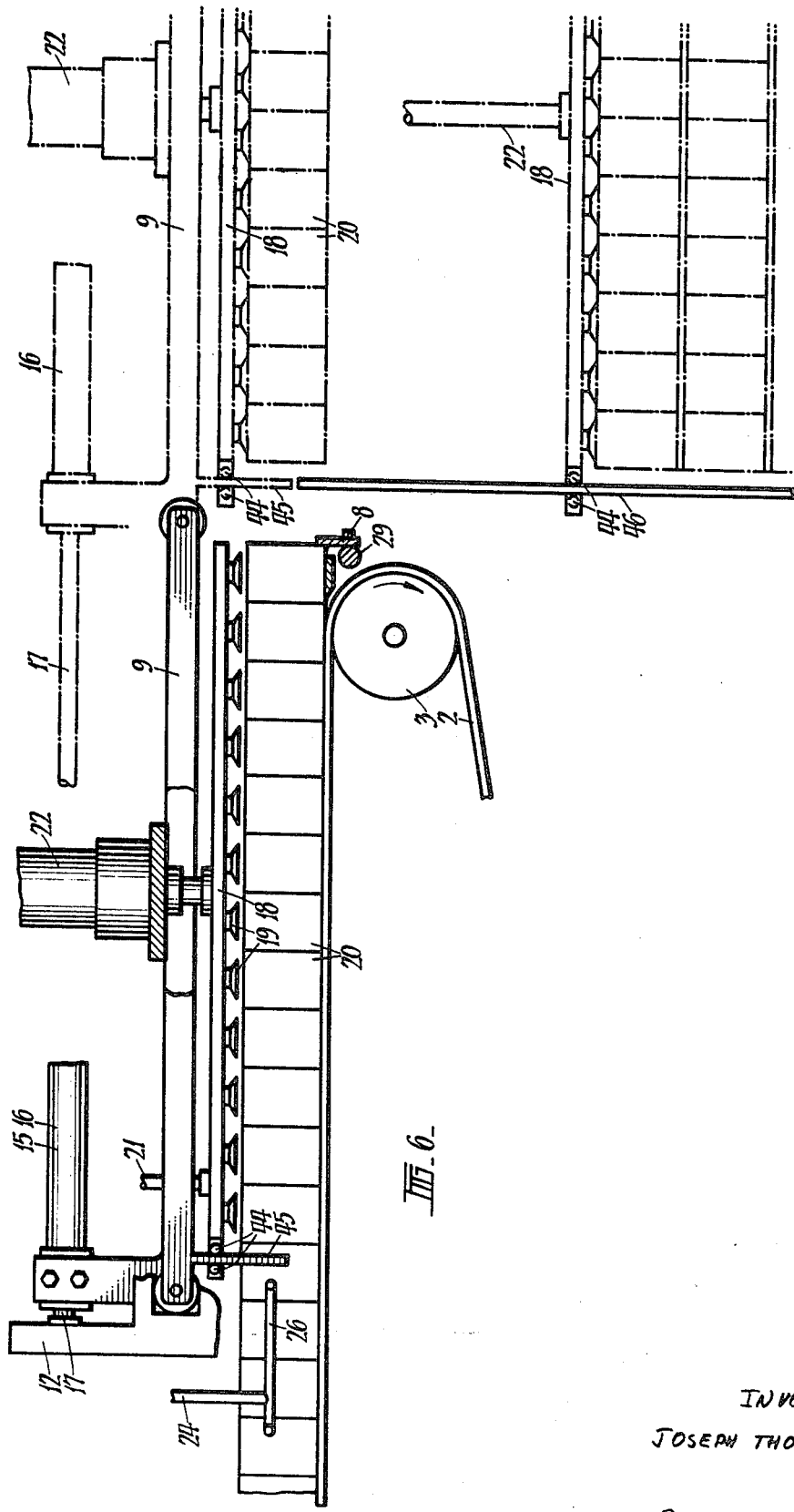

APPARATUS FOR PALLETIZING CANS, JARS, BOTTLES OR OTHER CONTAINERS

This invention relates to an improved apparatus for assembling and depositing layers of cans, jars, bottles or other containers on a pallet or the like and building same in stack form for subsequent handling by means of a forklift truck or other mechanical means. The apparatus is particularly suitable for palletizing canned goods, such as canned fruit, in a cannery.

It is customary in fruit canneries to store the filled and sealed cans in a cool room or other storage space until such time as the cans are required for labelling and packing into crates and cartons for distribution. For this purpose, it is very desirable to use a pallet system to facilitate handling. The transfer of the cans from the usual conveyor to the pallet is, under existing conditions, slow and laborious and the present invention has, for its object, the provision of an apparatus which will effectively and efficiently perform this operation.

According to the invention, the improved apparatus comprises means for marshalling the cans or containers, a carriage movable horizontally from a pickup position over the marshalled cans or containers to a depositing position, a suction head carried by the carriage and having suction cups or the like, means for engaging the suction cups with the marshalled cans or containers while the carriage is at the pickup position to grip said cans or containers, means for moving the carriage with the suction head and gripped cans or containers to the depositing position and means for then lowering the suction head to deposit the cans or containers onto a pallet and build up successive layers of cans or containers into a palletized stack.

The invention is more fully described and ascertained aided by reference to the accompanying drawings which show the preferred embodiment of the apparatus particularly suited for handling cans of fruit. In these views:

FIG. 1 is a side elevation of the improved apparatus in operation and showing one assembled layer of cans about to be deposited.

FIG. 2 is a side elevation showing in more detail the movable carriage and mechanism associated therewith.

FIG. 3 is a vertical section taken substantially on line 3—3 of FIG. 2.

FIG. 4 is a detail view showing the operation of the mechanism shown in FIG. 2.

FIG. 5 is a vertical section taken substantially on line 5—5 of FIG. 2.

FIG. 6 is a longitudinal section showing in broken lines the operation of the apparatus in building a stack of layers of cans on the pallet.

As is shown in these views, the apparatus comprises a main frame 1 supporting, at its upper end, an endless broad belt conveyor 2 supported by end rollers 3 and suitably driven from an electric motor 4 as by means of a power transmission belt 5. The belt conveyor 2 moves across a flat table 6 on the upper end of the frame 1 and receives the cans of fruit from the usual feed conveyor 7.

Arranged at one end of the conveyor 2 is a transverse stop member 8 against which the cans abut and are marshalled. The movement of the conveyor causes the cans to assemble and be marshalled in a layer of regular row formation against the stop member 8 as is shown particularly in FIG. 6. When the apparatus is first started up, it may be necessary to first assemble two or three rows of cans by hand against the stop member 8 to initiate the row-building operation but, after that, the operation is automatic, the cans rolling one along the other and marshalling into the row formations against the stop member solely under the movement of the conveyor 2.

Arranged above the conveyor 2 is a horizontally movable carriage 9 having wheels or rollers 10 adapted to move within guide tracks 11 on a superstructure 12 supported from the main frame 1. Said superstructure is arranged over the end portion of the conveyor 2 at which the cans are marshalled into row formation against the stop member 8 and also overhangs over a space 13 in which the deposited layers of cans are built into stack arrangement on the pallet.

The horizontal movement of the carriage 9 may be further guided by providing small rollers 14 on the opposite sides of the carriage running against the sidewalls of the superstructure 12.

The carriage 9 is moved by means of suitable actuators as 15 which may be pneumatically, hydraulically or otherwise actuated. Said actuators may take the form of cylinders 16 on the carriage and rods 17 on the superstructure 12 connected to pistons within the cylinders. The actuating fluid, which is preferably compressed air, is admitted to the cylinders on opposite sides of the pistons to move the carriage in opposite directions.

The carriage 9 supports a hollow suction head 18 having a plurality of suction cups 19 arranged to correspond to and register with the marshalled cans as 20 on the conveyor 2. Vacuum is supplied to the suction head 18 and cups 19 as by a hose 21.

The suction head 18 is capable of vertical movement. Such movement may be effected by an actuator 22 which may be of the cylinder and piston type actuated by compressed air.

Arranged at one side of the conveyor 2 to be acted on by the assembled cans 20 is a trip device 23 which may comprise an arm 24, see FIG. 5, pivoted at its upper end and acted on by a weight 25 to cause its lower end 26 to be extended into the path of the cans being marshalled on the conveyor 2. Said trip device also has a member 27 at its upper end adapted, when the lower end 26 of the arm 24 is moved outwardly by the cans, to actuate a switch 28.

The stop member 8 is controlled by suitable release and resetting mechanism, such as that shown in detail in FIG. 4. The stop member 8 is secured to a transverse shaft 29 which, at one end, supports a plate 30. Said plate has a detent 31 normally engaging a detent 32 on a lever 33. The detents are held engaged by a spring 34 acting on the lever 33, see FIG. 2. The lever 33 is mounted on a shaft 35 carrying an arm 36 adapted to be actuated by an actuator 37 to thus disengage the detents 31 and 32 and release the stop member 8.

To reset the stop member 8, a resetting cam 38 is provided on the carriage 9 and arranged to engage a roller 39 on a lever 40 pivoted to the plate 30. The lever 40 is pivoted to a swinging link 41 pivoted to subframe 42 which also supports the shafts 29 and 35. When the cam 38 strikes the roller 39 on the movement of the carriage, it operates the lever 40 to move the plate 30 in such manner that the stop member 8 is moved upwardly to its can-stopping position and the detents 31 and 32 again engaged to hold the stop member 8 in the aforesaid position.

In the operation of the apparatus, the belt conveyor 2 which operates continuously receives the filled cans from the usual feed conveyor 7 which may convey the cans from the cooker. The cans are carried by the conveyor 2 and marshal in rows against the stop member 8. When the marshalled cans have built up sufficiently to extend rearwardly beyond the suction head 18, the trip device 23 is actuated by the cans, causing the switch 28 to be operated. This is a preparing switch and may release a safety device of approved type enabling electric switches, such as press buttons, controlling the operation of apparatus to be operated manually in the required sequence.

The first operation is moving the suction head 18 down to cause the suction cups 19 to be engaged with the tops of the marshalled cans 20. This may be done by manually operating a press button to operate the actuator 22. Suction is then applied to the suction head 18 and suction cups 19 through the hose 21 to cause the cans 20 to be gripped and held thereby. A manually operated press button may control the application of the suction in this manner.

The actuator 37 is then actuated by manual operation of a press button to release the stop member 8 and the carriage moving actuators 15 actuated also by a press button to move the carriage 9 with the suctionally held cans from the position shown in full lines in FIG. 6 to that shown in broken lines on the right at the top. At such position the carriage 9 is over the space 13. The actuator 22 is again operated by press button to lower the suction head 18 with the supported cans onto a pallet as 43 in the space 13. The broken lines at the lower right-hand side of FIG. 6 show the position at this stage. The vacuum to the suction head 18 is then cutoff by press button control so that the cans are deposited onto the pallet 43.

The suction head 18 is then elevated by the actuator 22 and the carriage 9 returned to its initial position over the conveyor 2 by press button control.

During the initial movement of the carriage 9 to the upper broken line position in FIG. 6, the cam 38 strikes the roller 39 and resets the stop member 8 as soon as the suction-held cans moved by the carriage are clear. Thus, while the operations of depositing the cans onto the pallet 43 and returning the suction head 18 and carriage 9 to initial positions are being performed, further cans are being carried by the conveyor 2, to build up or marshal against the stop member 8 in the same manner as previously described and the whole sequence of operations repeated to deposit further layers of cans and build up a stack on the pallet 43.

To ensure accurate depositing of the cans onto the pallet 43 and the stack of cans being built up in the space 13, the suction head 18 may be guided in its vertical movement by appropriate guide means. Said means may consist of spaced rollers 44 on one end of the suction head running upon a short vertical rod 45 carried by the carriage 9. Said short rod 45 is arranged to axially align with a vertical guide rod 46 in the space 13, see FIG. 6, so that the rollers 24 of the suction head roll from the short rod 45 onto the aligned guide rod 46. The downward depositing movement of the suction head 18 is thus accurately guided.

The stack of layers of cans built on the pallet 43 in the space 13 can be removed from time to time as required by means of a forklift truck or other means.

The apparatus will be found very effective in use and considerably reduces the labor required in palletizing cans of fruit while also greatly expediting operations.

Instead of effecting the various operations of the apparatus by manual button control, as described, it is possible to carry out the entire cycle of operations automatically in required sequence. This may be effected by means such as a sequence timer which electrically controls the operations of the actuators 15, 22 and 37 and the application and cutoff of the suction to the suction cups 19. The operation of such sequence timer may be automatically initiated by operation of the switch 28.

I claim:

1. Apparatus for palletizing cans or similar containers comprising, in combination, support means; a retractable stop member mounted on said support means movable between an active position and an inactive position; conveyor means for marshalling containers against said stop member while the latter is in said active position; a carriage mounted on said support means movable horizontally from a pickup position located over the marshalled containers to a depositing position; a suction head carried by said carriage and having suction cups; means for engaging said suction cups with the containers while said carriage is at said pickup position so that the containers are gripped by said suction cups; means for horizontally moving said carriage with said suction heads and gripped containers to the depositing position; means for releasing said stop member before said carriage is moved to said depositing position so that said stop member will move to its inactive position during movement of said carriage and the gripped containers to said depositing position, said means for releasing said stop member comprising a member retained in a position to hold said stop member in said active position and an actuator for releasing said retained member to release said stop member; means for resetting said retained member to hold said stop member in said active position and comprising a cam on said carriage acting to reset said retained member while said carriage is being moved from said pickup to said depositing position; and means for lowering said suction head when said carriage is in said depositing position to deposit the containers onto a pallet and to build up successive layers of containers in a palletized stack.

2. Apparatus as claimed in claim 1 wherein the means for engaging the suction cups with the marshalled containers comprise an actuator for lowering the suction head to cause the suction cups to suctionally grip the containers.

3. Apparatus as claimed in claim 2 wherein the means for lowering the suction head to deposit the containers onto the pallet comprise the same actuator used for lowering the suction head onto the containers.

4. Apparatus as claimed in claim 1 wherein the means for moving the carriage comprise actuators operated by fluid pressure.

5. Apparatus as claimed in claim 1 including a superstructure extending from the pickup position over the depositing position, the carriage being movable in guides in said superstructure.